(12) United States Patent
Girondi

(10) Patent No.: US 11,891,931 B2
(45) Date of Patent: Feb. 6, 2024

(54) BLOW-BY GAS FILTRATION ASSEMBLY WITH SUPPORT GROUP

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 437 days.

(21) Appl. No.: 17/311,934

(22) PCT Filed: Dec. 12, 2019

(86) PCT No.: PCT/IB2019/060717
§ 371 (c)(1),
(2) Date: Jun. 8, 2021

(87) PCT Pub. No.: WO2020/121249
PCT Pub. Date: Jun. 18, 2020

(65) Prior Publication Data
US 2022/0025792 A1    Jan. 27, 2022

(30) Foreign Application Priority Data
Dec. 14, 2018 (IT) .................. 102018000011124

(51) Int. Cl.
*F01M 13/04* (2006.01)
*B01D 46/00* (2022.01)
(Continued)

(52) U.S. Cl.
CPC ......... *F01M 13/04* (2013.01); *B01D 46/0005* (2013.01); *B01D 46/0041* (2013.01);
(Continued)

(58) Field of Classification Search
None
See application file for complete search history.

(56) References Cited

U.S. PATENT DOCUMENTS

| 4,981,502 A * | 1/1991 | Gottschalk ............. B01D 45/14 |
| | | 55/438 |
| 2002/0096050 A1 | 7/2002 | Miles |
| 2018/0104633 A1* | 4/2018 | Bonne .................... F01M 13/04 |

FOREIGN PATENT DOCUMENTS

| DE | 37 37 221 C1 | 4/1989 |
| EP | 1 344 559 A1 | 9/2003 |
| JP | 2003-065030 A | 3/2003 |

OTHER PUBLICATIONS

International Search Report and Written Opinion of the International Searching Authority for International Patent Application No. PCT/IB2019/060717 dated Feb. 28, 2020, 9 pages.
(Continued)

*Primary Examiner* — Gabriel E Gitman
(74) *Attorney, Agent, or Firm* — Merchant & Gould P.C.

(57) ABSTRACT

A blow-by gas filtration assembly fluidically connects to a vehicle engine system to receive blow-by gases and filter the suspended particles. A filtration assembly main body includes a filtration chamber and an outlet mouth. A filter group is radially crossable by blow-by gases from outside to inside, including a central cavity. A command group partially houses and supports on the main body operatively connected to the filter group to command the filter group in rotation. A support group supporting the filter group includes a bearing element with an outer fifth wheel sealingly engaging an outlet edge, an inner fifth wheel defining an outlet passage for filtered blow-by gases, and a hollow tubular member defining an outlet duct, including a bearing end operatively connected to the inner fifth wheel and a support portion extending from the bearing end, in the central cavity, mounting the filter group on the support portion.

18 Claims, 7 Drawing Sheets

(51) Int. Cl.
*B01D 46/26* (2006.01)
*B01D 46/24* (2006.01)

(52) U.S. Cl.
CPC ...... *B01D 46/0056* (2013.01); *B01D 46/2411* (2013.01); *B01D 46/26* (2013.01); *F01M 2013/0438* (2013.01); *Y10S 55/19* (2013.01)

(56) References Cited

OTHER PUBLICATIONS

Italian Search Report for Italian Patent Application No. 2018000011124 dated Aug. 29, 2019, 7 pages.

\* cited by examiner

BLOW-BY GAS FILTRATION ASSEMBLY WITH SUPPORT GROUP

This application is a National Stage Application of PCT/IB2019/060717, filed 12 Dec. 2019, which claims benefit of Serial No. 102018000011124, filed 14 Dec. 2018 in Italy, and which applications are incorporated herein by reference. To the extent appropriate, a claim of priority is made to each of the above-disclosed applications.

FIELD OF APPLICATION

The present invention relates to a blow-by gas filtration assembly.

In particular, the blow-by gas filtration assembly of the present invention is fluidically connectable to the crankcase ventilation circuit of an internal combustion engine system inside of a vehicle to receive blow-by gases (from said crankcase) and filter them from the suspended particles contained therein.

Specifically, "blow-by gas" means oil vapours vented from the crankcase of an internal combustion engine during its operation. In particular, said blow-by gases have a composition similar to that of exhaust gases and are generated by combustion of the air/fuel mixture in the combustion chamber. Instead of reaching the exhaust gas emission circuit, these gases leak into the lower portion of the crankcase, passing alongside the cylinders and bringing carbon particles and oil drops with them. In the present discussion, for the sake of simplicity, blow-by gases are considered to consist of air and suspended particles; said suspended particles comprise oil droplets and/or carbonaceous particulates.

STATE OF THE ART

In the state of the art, solutions of filtration assemblies that are fluidically connectable to the crankcase and suitable for venting it from blow-by gases are known of.

Specifically, blow-by gas filtration assembly solutions which separate unwanted suspended particles from the aforesaid blow-by gases are known of, comprising a filter group having such purpose.

In the state of the art, a plurality of embodiments of filtration assemblies are known: for example, a first type provides for the presence of a filter group comprising a porous filter medium suitable for filtering blow-by gases when crossed by them; a second type provides for the presence of a filter group comprising a plurality of discs mutually spaced apart and guided in rotation, in which by the action of the centrifugal force the suspended particles are separated from the air; a third type which provides for the combination of the first two types, in which, in fact, a porous filter medium is provided that is guided in rotation.

In the above context, with particular reference to the aforementioned third preferred embodiment, the known solutions are particularly complex and difficult to assemble (and disassemble) with particular reference to the operations related to the filter groups, which must potentially be subjected to specific maintenance and replacement operations over time.

Solution According to the Invention

In the aforesaid state of the art the need is therefore strongly felt to have a blow-by gas filtration assembly that solves the aforesaid problem, being simple in shape and above all requiring simple assembly (and disassembly) of the relative filter groups.

The purpose of the present invention is to provide a new improved embodiment of a blow-by gas filtration assembly satisfying said requirement.

DESCRIPTION OF THE DRAWINGS

Further characteristics and advantages of the invention will, in any case, be evident from the description given below of its preferred embodiments, made by way of a non-limiting example with reference to the appended drawings, wherein.

DETAILED DESCRIPTION

Figure 1:
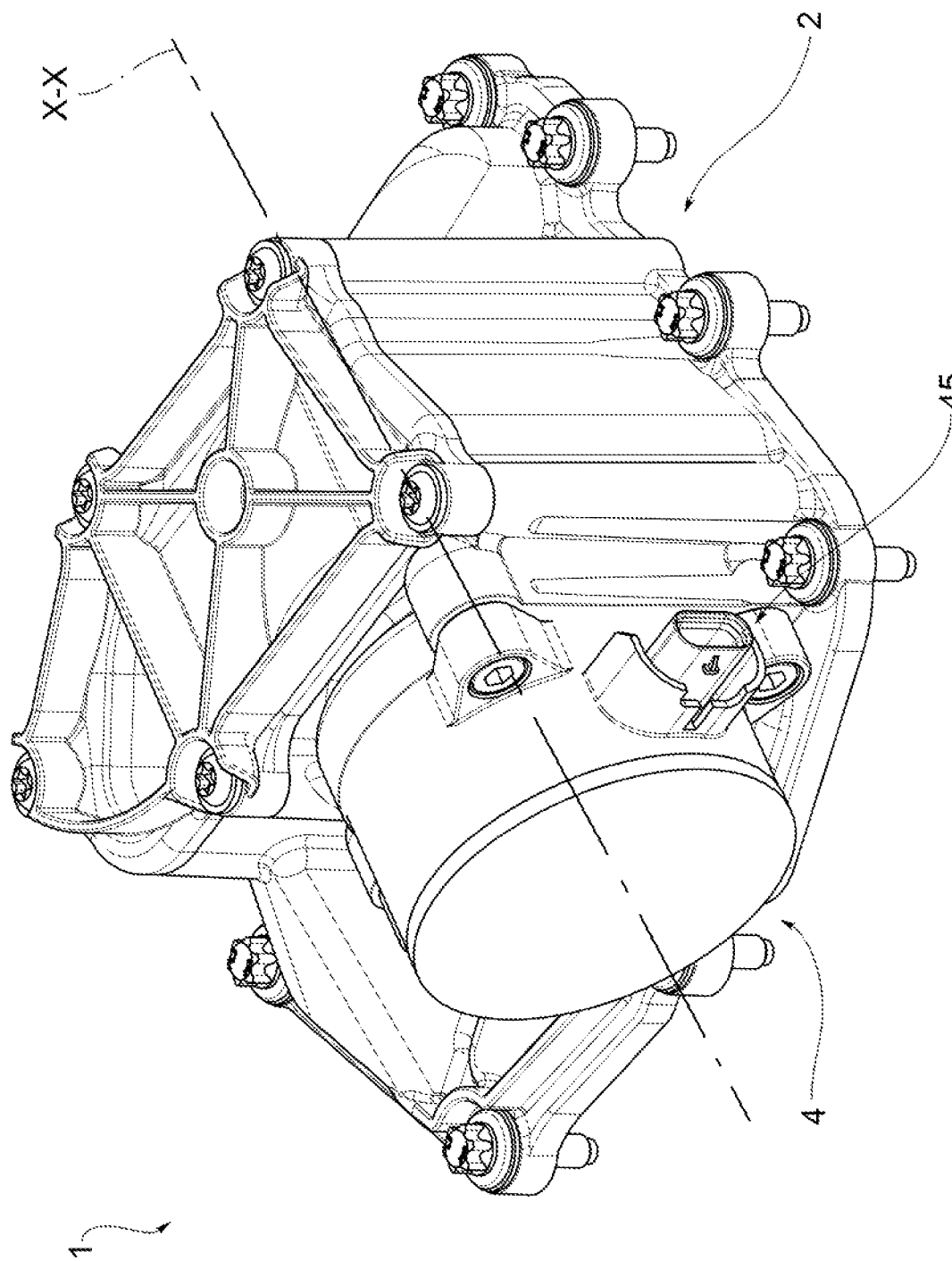
FIG. 1 shows a perspective view of the blow-by gas filtration assembly of the present invention, according to a preferred embodiment.
Figure 2:
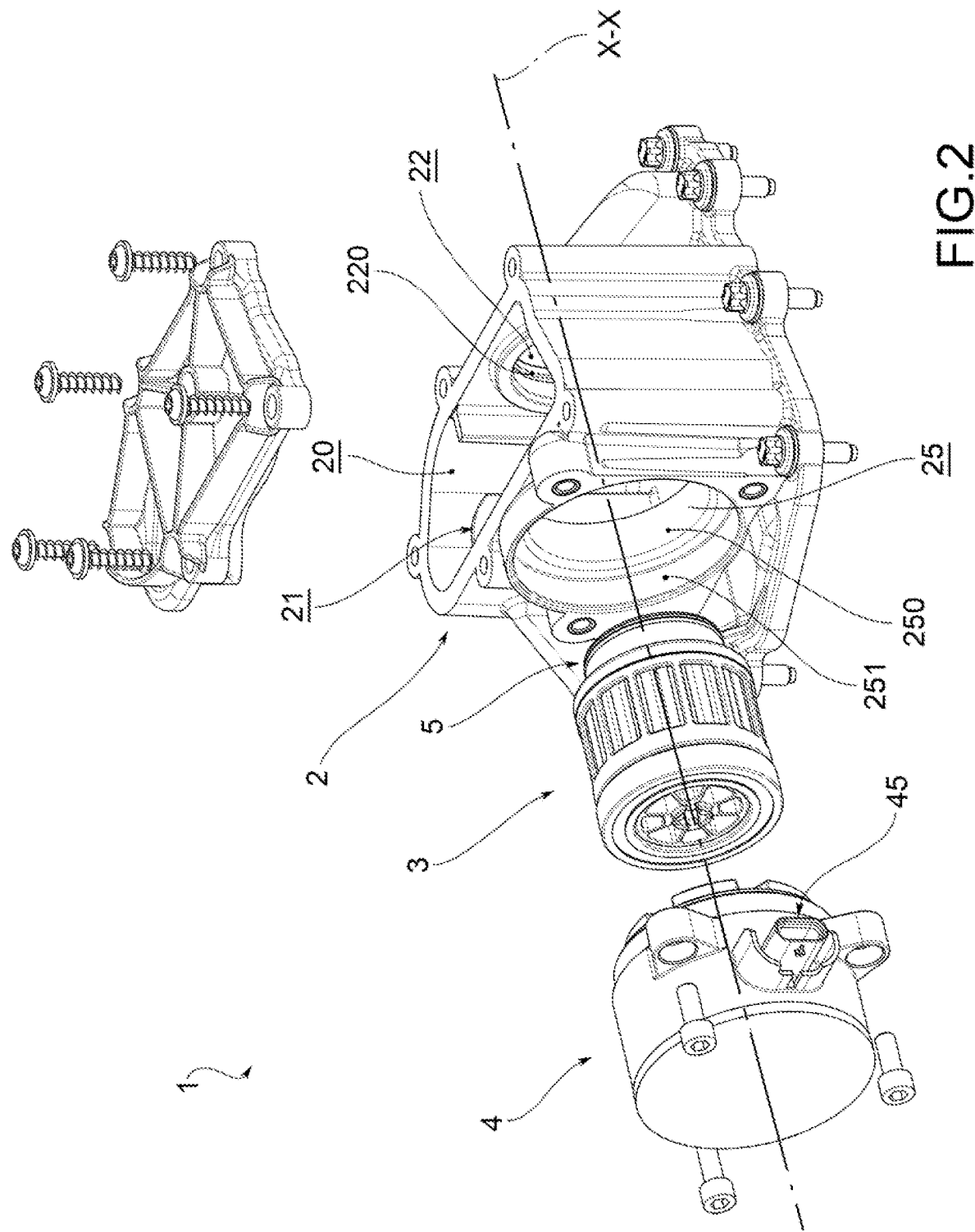
FIG. 2 shows a perspective view in separate parts of the blow-by gas filtration assembly in FIG. 1.
Figure 3:
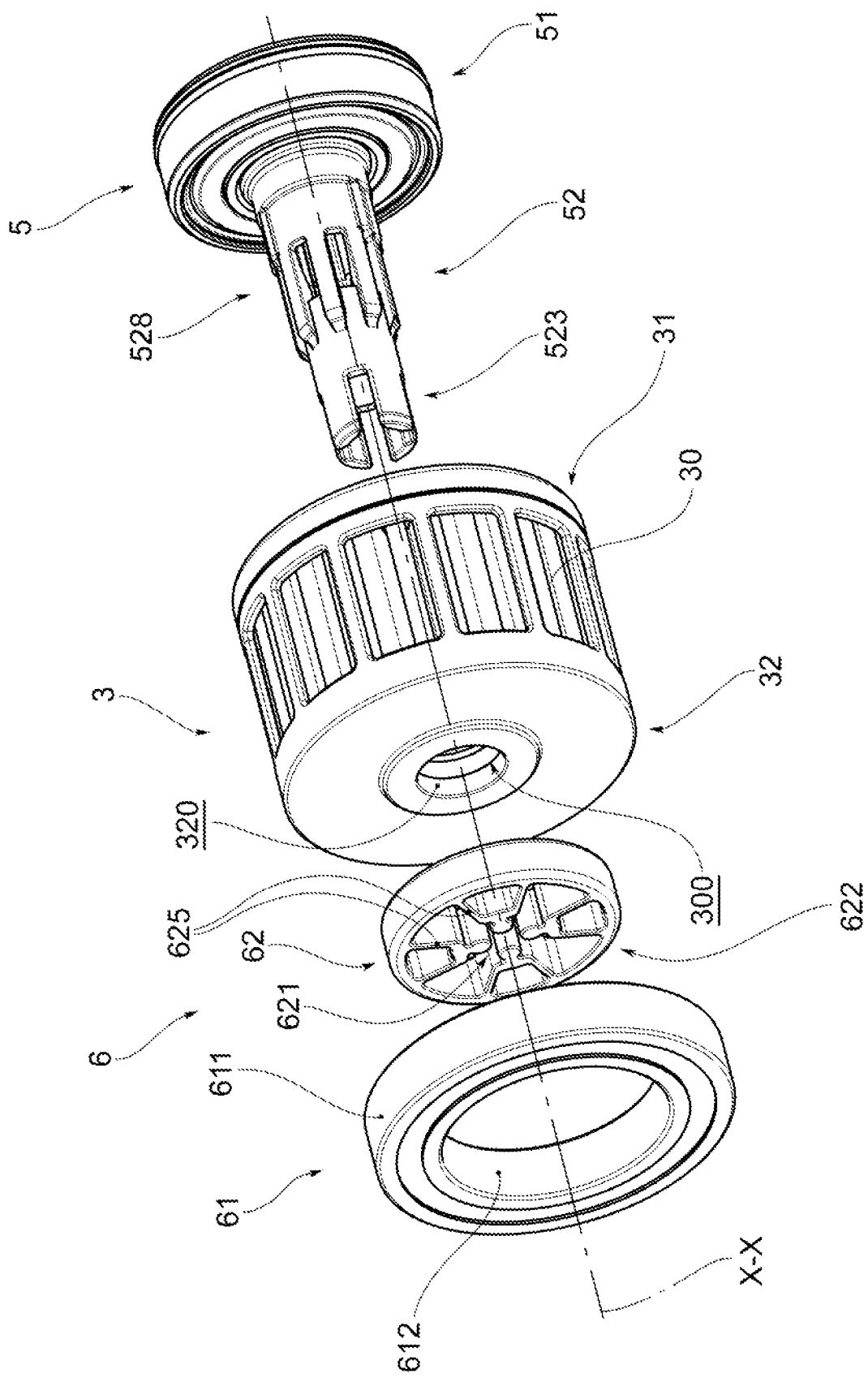
FIG. 3 represents a perspective view in separate parts of a filter group, of a support group and of an alignment group comprised in the blow-by gas filtration assembly in FIG. 2.
Figure 4:
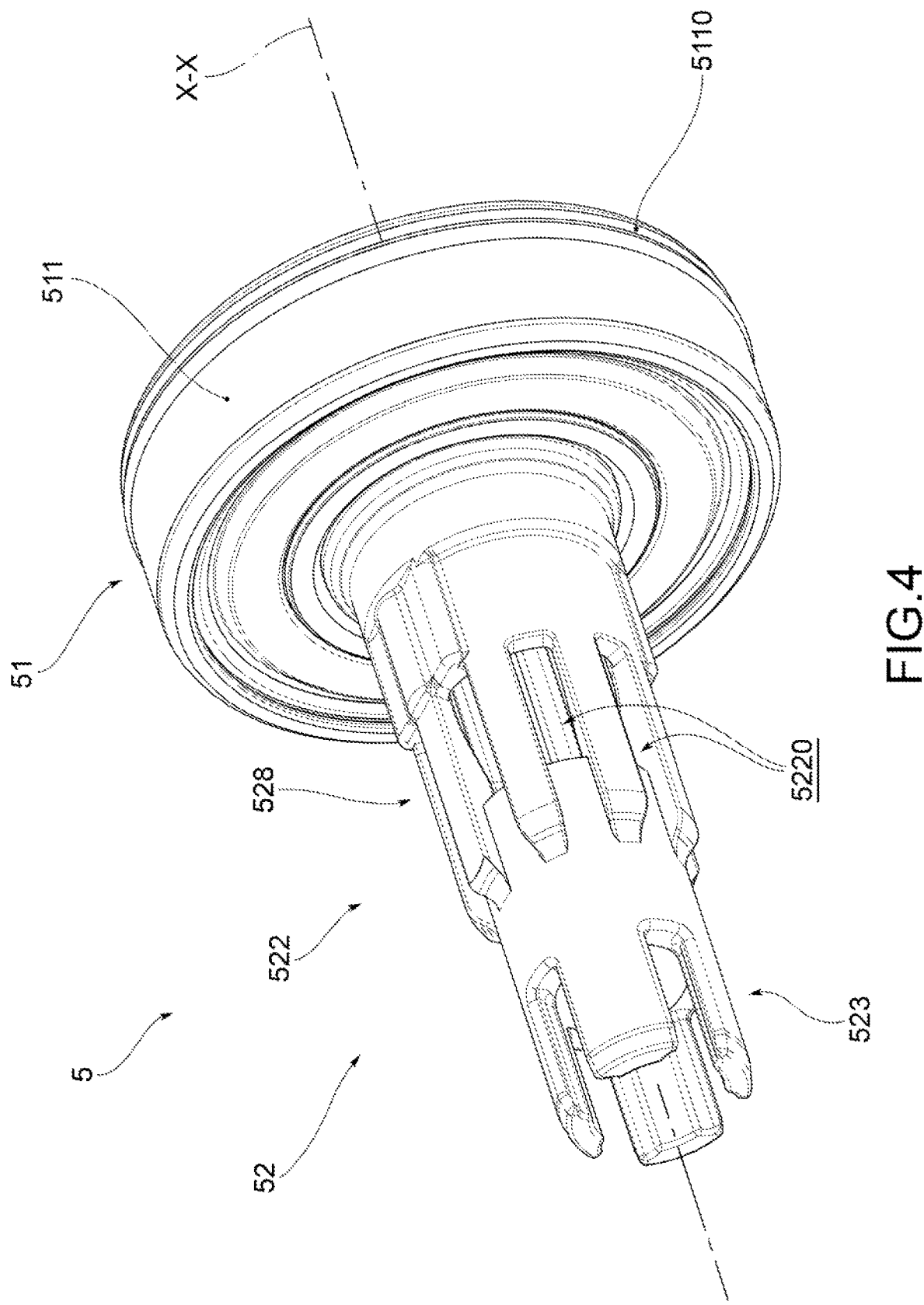
FIGS. 4 and 4a show a support group according to a preferred embodiment, in perspective and in longitudinal cross-section.
Figure 4A:
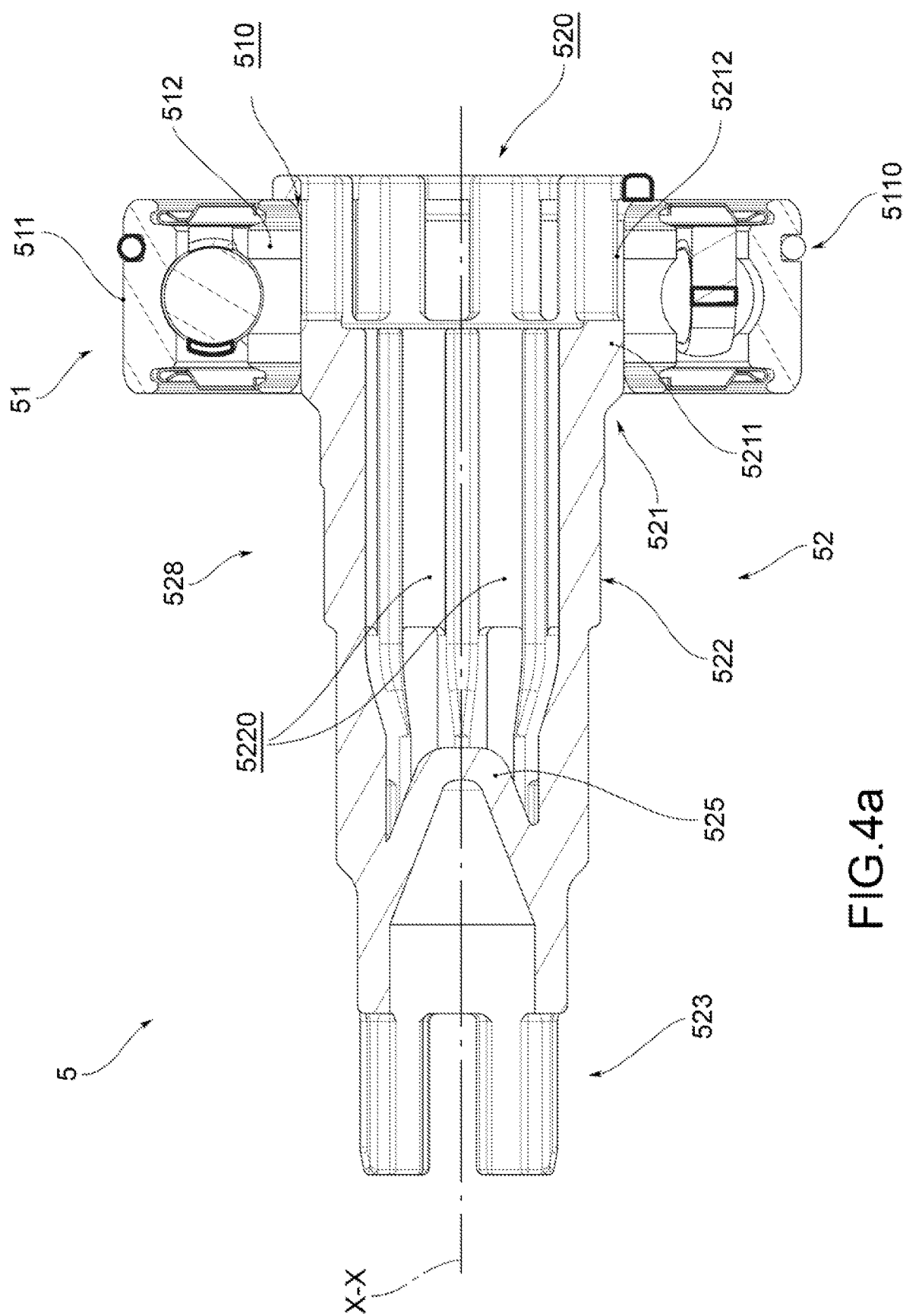
Figure 5:
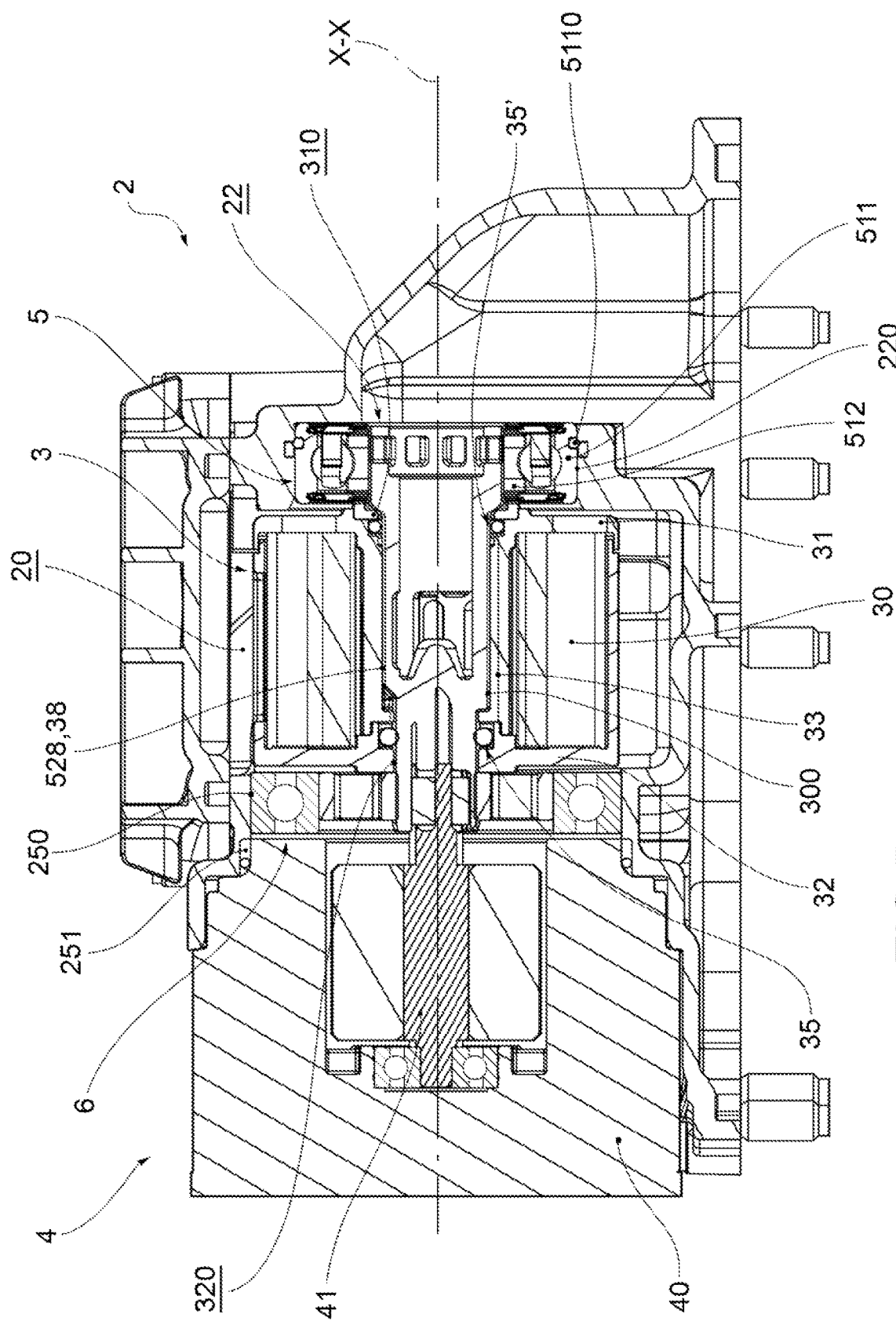
FIG. 5 shows a longitudinal cross-section view of the blow-by gas filtration assembly in the preceding figures.
Figure 6:
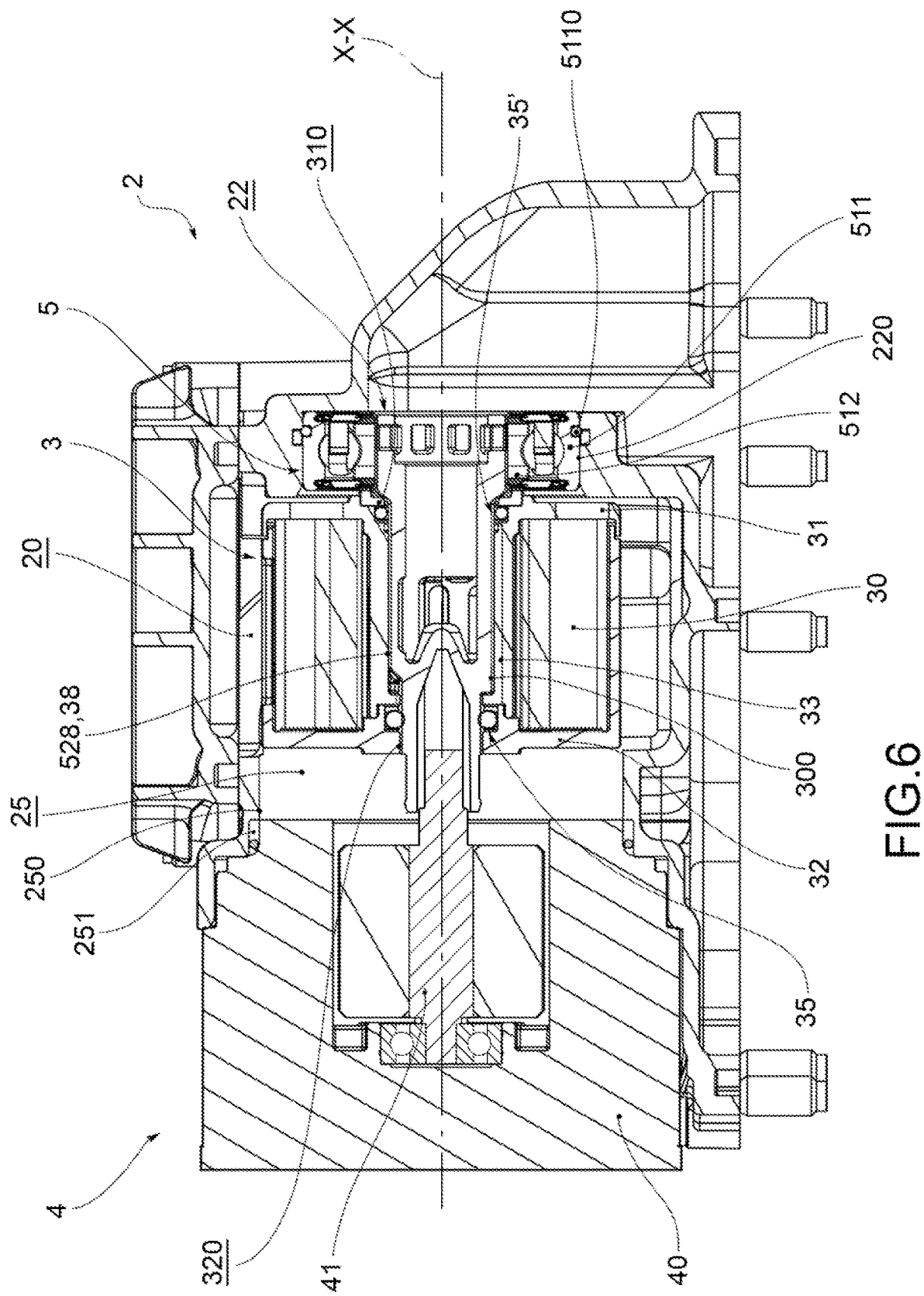
FIG. 6 shows a longitudinal cross-section view of the blow-by gas filtration assembly of the present invention, according to an embodiment variant.

With reference to the appended drawings, reference numeral 1 denotes a blow-by gas filtration assembly suitable for performing a filtration/separation action on particles (liquid and/or solid) suspended in the gas stream.

Said blow-by gas filtration assembly 1 is fluidically connectable to a crankcase ventilation circuit of an internal combustion engine of a vehicle to receive blow-by gases and filter from them the suspended particles contained therein returning a stream of clean gas (i.e. filtered) to other vehicle systems such as, for example, to the engine air intake circuit communicating with the combustion chamber of the internal combustion engine.

Preferably, said blow-by gas filtration assembly 1 is directly assemblable to the crankcase of an internal combustion engine of a vehicle. In particular, the present invention is not limited to this feature; the blow-by gas filtration assembly 1 could be configured as a stand-alone device comprising respective inlet and outlet ports communicating respectively with the crankcase, for receiving blow-by gases to be filtered, and with the air intake circuit, for recirculating the gas stream filtered of solid and liquid particles towards the combustion chamber.

According to the present invention, the filtration assembly 1 comprises an X-X axis with respect to which the components described below extend or are positioned.

According to the present invention, the blow-by gas filtration assembly 1 comprises a main body 2. Preferably, the other components of the system are positioned in or on said main body 2, as described extensively below and evident from the exemplary figures attached below.

In particular, the main body 2 comprises a filtration chamber 20 in which filtration/separation operations of the blow-by gases take place. The filtration chamber 20 is therefore fluidly connected to the crankcase ventilation circuit of an internal combustion engine of a vehicle to receive dirty blow-by gases, i.e. comprising suspended particles (solid and/or liquid), and emit clean blow-by gases, i.e. cleaned of suspended particles, into the engine air intake system.

According to a preferred embodiment, the main body 2 comprises respective blow-by gas inlets and outlets.

In particular, the main body 2 comprises an inlet mouth 21 fluidly connected with the crankcase ventilation circuit of a vehicle to receive blow-by gases to be filtered. Preferably, said inlet mouth 21 is made substantially parallel to the X-X axis spaced therefrom. Preferably, said inlet mouth 21 is made on the side wall of the main body 2.

The main body 2 comprises an outlet mouth 22. Said outlet port 22 is made positioned on the X-X axis, preferably, the outlet mouth 22 is perpendicular to said X-X axis. Preferably, the outlet mouth 22 is coaxial to the X-X axis.

The outlet mouth 22 is bounded laterally, annularly, by an outlet edge 220.

According to a preferred embodiment, from the outlet mouth 22, the main body 2 provides for an outlet connection that interfaces with the motor air intake circuit communicating with the combustion chamber of the internal combustion engine of a vehicle.

According to a preferred embodiment, moreover, the main body 2 comprises an insertion opening 25 through which the components described below are insertable inside the main body 2, preferably inside the filtration chamber 20. Said insertion opening 25 is made in a position opposite the outlet mouth 22. Preferably, the insertion opening 25 is made along the X-X axis having its extension (orientation) parallel to the outlet mouth 22. Preferably, the insertion opening 25 is defined laterally, annularly, by an insertion edge 250. Preferably, the insertion edge 250 and the outlet edge 220 are respectively concentric with respect to the X-X axis. Preferably, the insertion opening 25 defines a larger opening of the outlet mouth 22 so as to allow and facilitate the insertion operations of the various components.

According to the present invention, the blow-by gas filtration assembly 1 comprises a filter group 3, housing and operating in said filtration chamber 20, specifically suitable for performing said filtration/separation operations of the particles suspended in blow-by gases.

The filter group 3 extends along the X-X axis having a hollow cylindrical shape, comprising, in fact, a central cavity 300.

The filter group 3 is crossable by blow-by gases from the outside to the inside. Preferably, the filter group 3 is crossable by blow-by gases in a radial direction from the outside towards the inside. The inlet mouth 21 is radially facing the filter group 3. Preferably, the inlet mouth 21 is radially facing the outer surface of the filter group 3 the outlet mouth 22 is axially facing the central cavity 300.

According to a preferred embodiment, the filter group 3 comprises a filter medium 30. The filter medium 30, which is radially crossable, comprises a non-woven fabric pleated in the form of a star or a porous cylindrical septum.

Moreover, according to a preferred embodiment, the filter group 3 comprises two filter plates 31, 32 at the ends of the filter medium 30.

In addition, according to a preferred embodiment, the filter group 3 comprises a central structure 33 which is housed inside the filter medium 30 and joins the two filter plates 31, 32, so that the filter plates 31, 32 are integrally connected in rotation. Preferably, said central structure 33 has a plurality of through openings suitable to allow the passage of the fluid being filtered.

As shown in the attached figures, the central cavity 300 extends through the filter plates 31, 32 surrounded by the filter medium 30.

According to a preferred embodiment, the central cavity 300 extends through respective through openings 310, 320 made on the filter plates 31, 32. Preferably, said openings 310, 320 are concentric to the X-X axis, like the central cavity 300.

According to the present invention, moreover, the filtration assembly 1 comprises a command group 4 supported on the main body 2 operatively connected to the filter group 3 to command it in rotation about the X-X axis.

According to a preferred embodiment, moreover, the filtration assembly comprises a command group 4 partially housed and supported on the main body 2 operatively connected to the filter group 3 to command it in rotation about the X-X axis.

According to a preferred embodiment, the command group 4 is mountable on the main body 2, closing so as to seal said insertion opening 25. Preferably, as shown in the attached figures, the command group 4 sealingly engages the insertion opening 25 in a radial direction and in particular the side wall defined by an insertion step 251.

According to a preferred embodiment, the command group 4 is of the electric type.

According to a preferred embodiment, the command group 4 is an electric motor of the brushless type.

According to a preferred embodiment, the command group has an electric connector 45 for the electric connection of the filtration assembly 1 to the vehicle ECU to command its operation.

In particular, the command group 4 comprises an electric motor 40 and a command shaft 41 moved in rotation by said electric motor 40. Preferably, said command shaft 41 is operatively connected with the filter group 3 to command it in rotation about the axis X-X.

According to the present invention, the blow-by gas filtration assembly 1 comprises a support group 5 supporting the filter group 3 to the main body 2. In particular, the filter group 3 is suitable for mounting on the support group 5. In particular, the support group 5 is suitable to be operatively connected to the command group 4 to receive the rotary action thereof and to transmit it to the filter group 3.

According to a preferred embodiment, the support group 5 is suitable to be fluidly connected to outlet mouth 22.

According to the present invention, in fact, the support group 5 comprises a bearing element 51 and a hollow tubular element 52.

The bearing element 51 is positioned in the outlet mouth 22 so that the blow-by gases in output from the filter group 3 pass through it.

The bearing element 51 comprises an outer fifth wheel 511 that sealingly engages the outlet edge 220 defining the outlet mouth 22. In addition, the bearing element 51 comprises an inner fifth wheel 512 defining an outlet passage 510 through which filtered blow-by gases circulating through the filter group 3 flow.

According to a preferred embodiment, the outer fifth wheel 511 houses a gasket element 5110 that annularly sealingly engages the outlet edge 220. According to a preferred embodiment, the bearing element 51 is a rotating ball bearing. According to a preferred embodiment, the bearing element 51 is a plain bearing. According to a preferred embodiment, the bearing element 51 is a bushing.

The hollow tubular element 52 extends along the X-X axis and is thus housed in the central cavity 300.

The hollow tubular element 52 defines inside it an outlet duct 520 of the filtered blow-by gases, i.e. cleaned, fluidly connected with the outlet mouth 22. The hollow tubular element 52 comprises a bearing end 521 operatively connected to the inner fifth wheel 512 and a support portion 522 extending from said bearing end 521 into the central cavity 300. This way, the filter group 3 is assembled on said support portion 522.

Preferably, the filter group 3 and the support portion 522 are mutually engaged to transmit the rotary action to each other by means of a shaped coupling. In other words, the hollow tubular element 52 and the central structure 33 are mutually operatively connected by a shaped coupling so that the hollow tubular element 52 is suitable to transmit the rotatory action to the central structure 33. Preferably, the support portion 522 comprises radial projections 528 and the filter group 3 comprises corresponding radial recesses 38 or vice versa. According to a preferred embodiment, the number and arrangement of said radial projections 528 and radial cavities 38 is such as to ensure and balance the rotational action.

According to a preferred embodiment of the present invention, the bearing element 51 and the hollow tubular element 52 are mutually joined tight.

Preferably the hollow tubular element 52 is made of thermoplastic material.

Preferably, the hollow tubular element 52 is made of a nylon-based material (PA, PA 6, PA 6.6 or a mixture thereof).

Preferably, the hollow tubular element 52 is made of a glass fibre reinforced nylon-based material. (PA+GF, PA 6.6+GF35, PA 6+PA 6.6+GF 35)

Preferably, the hollow tubular element 52 is made of a material comprising a polyamide-based compound (e.g., PPA).

Preferably the inner fifth wheel 512 is made of metal. Preferably the inner fifth wheel 512 is made of high-strength steel (e.g. nitrated chromium steel)

Preferably, the inner fifth wheel 512 is made of a high wear resistance metal alloy such as, for example, the alloy 100Cr6.

Preferably, the bearing element 51 and the hollow tubular element 52 are joined by moulding, i.e. they are subject to a moulding operation that joins them in an integral manner. Preferably, the bearing element 51 and the hollow tubular element 52 are joined by injection moulding.

In particular, the bearing end 521 is over-moulded to the inner fifth wheel 512.

Preferably, the bearing end 521 comprises an inner annular section 5211, preferably proximal to the support portion 522, which sealingly annularly engages the inner fifth wheel 512.

Preferably, the bearing end 521 comprises an outer annular section 5212, preferably distal to the support portion 522, which firmly engages the inner fifth wheel 512. Preferably, said outer annular section 5212 comprises a series of grooves angularly spaced about the X-X axis. Said grooves have a U-shape and face the clean side of the filtration assembly. Said grooves mimic the profile of inserts provided inside the mould to ensure the correct positioning of the bearing element 51 inside the processing mould.

Said outer annular section 5212 overhangs beyond the outer inner fifth wheel profile 512 to increase the contact surface and improve the reciprocal coupling between the hollow tubular element 52, in particular the bearing end 521, and the inner fifth wheel 512.

Preferably, the bearing end 521 comprises a coil/labyrinth section suitable to complicate a possible transit of leaking gas, from the dirty side of the filter group 3 towards the outlet duct. Said coil/labyrinth section is made on the contact region of the inner annular section 5211 or in an intermediate region between the inner annular section 5211 and the outer annular section 5212.

According to a preferred embodiment, the hollow tubular element 52 comprises an inner diffuser 525 housed in the outlet duct 520 which directs the flow of filtered blow-by gases towards the outlet passage 510 and closes the outlet duct 520 at the opposite end of the outlet passage 510.

According to a preferred embodiment, said inner diffuser 525 has a substantially tapered shape in the direction of the outlet passage 510.

Preferably, the inner diffuser 525 has a substantially conical, or pyramidal shape, having the proximal apex at the outlet passage 510.

According to a preferred embodiment, furthermore, the support portion 522 comprises a plurality of longitudinal slots 5220 through which filtered blow-by gases flow. Preferably, the longitudinal slots 5220 are mutually angularly equidistant. Preferably, the longitudinal slots 5220 extend for an axial section substantially equal to the filter medium 30.

Preferably, the filter group 3 sealingly engages the support portion 522 comprising an inner filter gasket 35 that engages the side walls of the support portion 522. Preferably, the inner filter gasket 35 is positioned in a position opposite the outlet passage 510 axially beyond the longitudinal slots 5220.

Preferably, the filter group 3 sealingly engages the support portion 522 comprising an auxiliary inner filter gasket 35' which in turn engages the side walls of the support portion 522.

Preferably, the auxiliary inner filter gasket 35' is positioned in a position proximal to the contact region 5211 provided between the hollow tubular element 52 and the inner fifth wheel 512, before the longitudinal slots 5220.

According to a preferred embodiment, in addition, the hollow tubular element 52 comprises a command end 523 opposite the bearing end 521, wherein the command group 4 is operatively connected to said command end 523 to command the rotation of the hollow tubular element 52 and thus of the filter group 3 housed thereon.

According to a preferred embodiment, the command end 523 is engaged by the command shaft 41. Preferably, the command end 523 and the command shaft 41 have a mutual insertion portion. Preferably, the command end 523 and the command shaft 41 are mutually coupled with a geometric coupling. Preferably, the command end 523 and the command shaft 41 are directly engaged to each other.

According to a preferred embodiment, the support group 5 and the filter group 3 are insertable into the main body 2 axially along the X-X axis through the above described insertion opening 25, the support group 5 sealingly engaging the outlet mouth 22, in particular the outlet edge 220. According to a preferred embodiment, the command group 4 is fittable to the main body 2 sealingly closing the insertion opening 25.

According to a preferred embodiment, the support group 5 and the filter group 3 are insertable in the main body 2 in an axial direction along the X-X axis through the above described insertion opening 25, and the command group 4 is fittable to the main body 2 sealingly closing said insertion opening 25.

According to a preferred embodiment, the blow-by gas filtration assembly 1 further comprises an alignment group 6 engaged to the main body 2 and the command end 523 to keep the hollow tubular element 52 and thus the filter group 3 aligned to the X-X axis.

In particular, the alignment group 6 is sandwiched (i.e. in an intermediate position) between the filter group 3 and the command group 4.

Preferably, the alignment group 6 comprises an annular alignment and centering element 62, operatively connected to the command end 523, and a dynamic alignment element 61.

According to a preferred embodiment, the dynamic alignment element 61 is a sliding gasket.

According to a preferred embodiment, the dynamic alignment element 61 is a rotating ball bearing. According to a preferred embodiment, the dynamic alignment element 61 is a plain bearing. According to a preferred embodiment, the dynamic alignment element 61 is a bushing.

According to a preferred embodiment, said dynamic alignment element 61 comprises an outer fifth wheel 611 sealingly engaging an insertion edge 250 defining the insertion opening 25 and an inner fifth wheel 612 engaged to the alignment and centering annular element 62.

Preferably, the annular alignment and centering element 62 has an annular shape comprising an inner region 621 that mounts and/or engages the hollow tubular element 52 and an outer ring 622 that engages the inner fifth wheel 612. Preferably, the inner region 621 and outer ring 622 are mutually joined to each other by radial spokes 625.

According to a preferred embodiment, the alignment and centering annular element 62 is in a rigid material.

According to a preferred embodiment, the alignment and centering annular element 62 is in an elastically yielding material.

According to a preferred embodiment, the alignment and centering annular element 62 is made of elastomeric material.

According to a preferred embodiment, the alignment and centering annular element 62 is made of a fluoroelastomeric material (e.g., FKM).

According to a preferred embodiment, the alignment and centering annular element 62 is made of fluorosilicone rubber or hydrogenated nitrile rubber.

According to a preferred embodiment, the alignment and centering annular element 62 ensures the mutual engagement between the support group 5 and the command group 4 even in the event of potential mutual misalignments (of the respective axes of the support group 5 and the command group 4) with respect to the X-X axis.

According to a preferred embodiment, the command shaft 41 engages the hollow tubular element 52 indirectly: the command shaft 41 engages the annular alignment and centering element 62 which in turn engages the hollow tubular element 52 to guide it in rotation.

Innovatively, the blow-by gas filtration assembly of the present invention widely fulfils the purpose of the present invention by presenting itself in a simple form and above all requiring simple assembly and disassembly operations of its filter group.

Advantageously, the support group and/or the alignment group undergo and discharge the forces of the engine group, preventing them from discharging onto the filter group.

Advantageously, the support group is a multifunction component that effectively transfers the torque generated by the command group to the filter group and fluidly connects the filter group to the filtered gas outlet duct preventing the leakage of blow-by gases from the dirty side of the filter group to the outlet duct.

Advantageously, the support group makes it possible to reduces the friction generated by the rotation of the filter group and thus reduces the electrical power absorbed by the filtration assembly during operation.

Advantageously, the filter group is designable and producible without the need to provide specific interface portions with the command group.

Advantageously, the filter group is simple to assemble/disassemble to/from the support group.

Advantageously, the blow-by gas filtration assembly is extremely effective in the action on said blow-by gases thanks to the combined action of the filter group that filters the solid particles and above all agglomerates the suspended oil particles that are subsequently subjected to the centrifugal rotation action.

Advantageously, the hollow tubular element directs, but above all favours, the outflow of the filtered blow-by gases towards the outlet mouth.

Advantageously, the hollow tubular element is made in a hollow shape and of thermoplastic material reducing the weight of the filtration assembly and therefore the consumption associated with the operation of the filtration assembly.

Advantageously, the support group, filter group and alignment group are insertable into the main body through simple insertion operations along a single axial direction.

Advantageously, the support group, filter group and alignment group are insertable into the main body through the same insertion opening which is closed by the command group. Advantageously, the need to have any closing lids provided specifically to allow the extraction and/or insertion of the components in the filtration chamber is obviated, simplifying the structure of the filtration assembly.

Advantageously, with a minimum number of seals, the potential problem of blow-by gas leakage is remedied.

Advantageously, the filter group requires a minimum number of sealing elements, for example, a single gasket, possibly two gaskets, is sufficient.

Advantageously, the filtration assembly is placeable in the vehicle in a predefined position not necessarily proximal to the internal combustion engine.

It is clear that a person skilled in the art may make modifications to the blow-by gas filtration assembly so as to satisfy contingent requirements, all contained within the scope of protection as defined by the following claims.

LIST OF REFERENCE NUMBERS 1 blow-by gas filtration assembly
2 main body
20 filtration chamber
21 inlet mouth
22 outlet mouth
220 outlet edge
25 insertion opening
250 insertion edge
251 insertion step
3 filter group
30 filter medium
31, 32 filter plate
310, 320 through openings
33 central structure
35 inner filter gasket
35' auxiliary inner filter gasket
38 radial recesses
300 central cavity
4 command group
40 electric motor 41 command shaft
45 electric connector
5 support group
51 bearing element
510 outlet passage
511 outer fifth wheel
5110 gasket element
512 inner fifth wheel
52 hollow tubular element
520 outlet duct
521 bearing end
5211 inner annular section
5212 outer annular section
522 support portion
5220 longitudinal slots
523 command end
525 inner diffuser
528 radial projections
6 alignment group
61 alignment bearing
611 outer fifth wheel
612 inner fifth wheel
62 alignment and centring annular element
621 inner region
622 outer ring
625 radial spokes
X-X rotation axis

The invention claimed is:

1. A blow-by gas filtration assembly fluidically connectable to a crankcase ventilation circuit of an internal combustion engine to receive blow-by gases and filter the blow-by gases from the suspended particles contained therein, wherein the filtration assembly has an axis and comprises:
   a main body comprising a filtration chamber extending along said axis and an outlet mouth made at the axis;
   a filter group which extends along the axis and has a hollow cylindrical shape comprising a central cavity, housed in said filtration chamber crossable by blow-by gases radially from outside to the inside;
   a command group supported on the main body operatively connected to the filter group to command the filter group in rotation about the axis;
   a support group supporting the filter group to the main body, comprising:
   i) a bearing element comprising an outer fifth wheel with an outer portion sealingly engaging an entire circumference of an outlet edge defining the outlet mouth and an inner fifth wheel defining an outlet passage through which filtered blow-by gases flow; and
   ii) a hollow tubular element extending along the axis defining an outlet duct of the filtered blow-by gases, comprising a bearing end operatively connected to the inner fifth wheel and a support portion extending from said bearing end, in the central cavity, wherein the filter assembly is mounted on said support portion and fluidly communicates with the outlet mouth.

2. The blow-by gas filtration assembly according to claim 1, wherein the hollow tubular element comprises an inner diffuser housed in the outlet duct which directs the flow of filtered blow-by gases towards the outlet passage and closes the outlet duct at an opposite end of the outlet passage.

3. The blow-by gas filtration assembly according to claim 2, wherein said inner diffuser has substantially tapered shape in the direction of the outlet passage.

4. The blow-by gas filtration assembly according to claim 1, wherein the support portion comprises a plurality of longitudinal slots.

5. The blow-by gas filtration assembly according to claim 1, wherein the bearing element and the hollow tubular element are reciprocally sealingly joined.

6. The blow-by gas filtration assembly according to claim 5, wherein the hollow tubular element is made of thermoplastic material and the bearing end is over-moulded to the inner fifth wheel.

7. The blow-by gas filtration assembly according to claim 5, wherein the bearing end comprises an inner annular section.

8. The blow-by gas filtration assembly according to claim 1, wherein the filter group comprises a filter medium and two filter plates at ends of the filter medium (30).

9. The blow-by gas filtration assembly according to claim 8, wherein the filter group comprises a central structure housed inside the filter medium and joining the two filter plates, so that the filter plates are integrally connected in rotation.

10. The blow-by gas filtration assembly according to claim 9, wherein the hollow tubular element and the central structure are mutually operatively connected by a shaped coupling so that the hollow tubular element transmits rotatory action to the central structure.

11. The blow-by gas filtration assembly according to claim 1, wherein the hollow tubular element comprises a command end opposite the bearing end, wherein the command group is operatively connected to said command end to command the rotation of the hollow tubular element and of the filter group housed thereon.

12. The blow-by gas filtration assembly according to claim 11, further comprising an alignment group engaged to the main body at the command end to keep the hollow tubular element and the filter assembly aligned with the axis.

13. The blow-by gas filtration assembly according to claim 1, wherein the support group and the filter group are insertable in the main body in an axial direction along the axis through an insertion opening opposite the outlet mouth wherein the command group is fittable to the main body sealingly closing said insertion opening.

14. The blow-by gas filtration assembly according to claim 12, wherein the alignment group comprises an annular alignment and centering element engaged to the command end and a dynamic alignment element comprising an alignment outer fifth wheel which sealingly engages an insertion edge defining the insertion opening and an alignment inner fifth wheel engaged to the annular alignment and centering element.

15. The blow-by gas filtration assembly according to claim 1, wherein the command group comprises an electric motor and a command shaft operatively connected to the hollow tubular element to command the hollow tubular element in rotation.

16. The blow-by gas filtration assembly according to claim 1, wherein the main body comprises an inlet mouth fluidically connectable to a crankcase ventilation circuit of an internal combustion engine for receiving blow-by gases to be filtered and fluidly connected with the filtration chamber, wherein said inlet mouth is made substantially parallel to the axis spaced therefrom.

17. The blow-by gas filtration assembly according to claim 1, wherein the support portion comprises a plurality of longitudinal slots equally angularly spaced from each other, through which the filtered blow-by gases flow.

18. The blow-by gas filtration assembly according to claim 5, wherein the bearing end comprises an inner annular section proximal to the support portion, which sealingly annularly engages the inner fifth wheel.

* * * * *